M. A. SMITH.
GRINDER HEAD STOCK.
APPLICATION FILED JULY 14, 1917.

1,303,607.

Patented May 13, 1919.
5 SHEETS—SHEET 2.

Inventor:
Milton A. Smith
Ramsey & Parmelee
Attys.

M. A. SMITH.
GRINDER HEAD STOCK.
APPLICATION FILED JULY 14, 1917.

1,303,607.

Patented May 13, 1919.
5 SHEETS—SHEET 4.

Inventor:
Milton A. Smith
Ramsey & Parmelee
Attys.

M. A. SMITH.
GRINDER HEAD STOCK.
APPLICATION FILED JULY 14, 1917.

1,303,607.

Patented May 13, 1919.
5 SHEETS—SHEET 5.

Inventor:
Milton A. Smith
by Ramsey & Parmelee
Attys.

UNITED STATES PATENT OFFICE.

MILTON A. SMITH, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

GRINDER HEAD-STOCK.

1,303,607.          Specification of Letters Patent.       Patented May 13, 1919.

Application filed July 14, 1917. Serial No. 180,658.

*To all whom it may concern:*

Be it known that I, MILTON A. SMITH, a citizen of the United States, and a resident of the city of Woonsocket, in the county of Providence, State of Rhode Island, have invented certain new and useful Improvements in Grinder Head-Stocks, of which the following is a specification.

This invention relates broadly to machine tools and more particularly to a headstock for grinding machines and the like.

The principal object of this invention is to provide a headstock for grinding machines wherein the work supporting element is rigidly supported upon an overhanging bearing whereby the vibration of the work support is minimized.

A further object of the present invention is to provide for rigidly mounting the center pin or chuck upon an overhanging bearing around which the driving member rotates.

A still further object of the present invention is the provision in a headstock for grinders and the like of an accurately and rigidly mounted work supporting shaft and drive device for said shaft and operatively connected with the work supporting shaft through freely moving connectors so that vibration in the driving mechanism is not transmitted to the work supporting shaft.

Another object of the present invention is to provide a work supporting shaft accurately and rigidly mounted in a suitable bearing frame and a driving mechanism mounted upon an independent bearing and connected to the supporting shaft so that the said shaft and the said driving mechanism may "float" one relative to the other.

Another and still further object of the present invention is to provide a headstock for grinders and the like wherein the driving element is connected to the elements to be driven through the medium of a clutch, preferably of the disk type, and wherein the opening of the clutch automatically applies a brake to the driven member.

A still further object of the present invention is the provision in a headstock for grinders or the like of a driven shaft supported in suitable tail stock bearings, with the driving pulley independently mounted in circumferential relation to the driven shaft with the face plate also individually and circumferentially mounted relative to said driven shaft and with a friction clutch between the pulley and the face plate and a positive clutch between the face plate and the driven shaft.

Other and further objects of the present invention will in part be obvious and will in part be pointed out hereinafter by reference to the accompanying drawings wherein like parts are represented by like characters throughout the several figures thereof.

Heretofore the common practice in the art of constructing headstocks for grinders and the like has comprised a construction wherein a headstock frame has comprised the supporting member for the spindle bearings and the driving pulley has been mounted directly upon the spindle. In some cases the frame has been formed U-shaped, each leg of the U-shaped member carrying a bearing with the driving pulley mounted directly on the spindle between the bearings. Another form has comprised a headstock frame carrying both rear and front bearings for the spindle with the driving pulley mounted on the end of the spindle outside of the bearings. In the first mentioned construction the frame itself is lacking in rigidity and in the second construction vibrations transmitted to one end of the spindle through the driving pulley magnify the vibrations at the other end of the spindle. In all of the prior art structures referred to the spindle is the carrying member for the driving pulley and any vibrations due to the driving belt are transmitted directly to the work supporting spindle. The work of a grinding machine usually is of high grade character in that the surfaces operated upon are usually accurately ground to predetermined dimensions, For this reason it is desirable to minimize vibration to the greatest possible extent.

The present invention overcomes the difficulties of the known prior art by providing constructions that obviate the transmission of vibrations from the driving pulley to the spindle. A further plan of the present invention contemplates the providing of a relatively long spindle with the driving pulley mounted upon a rigid steel sleeve or quill and independently of the spindle with a pawl or plug and slot engagement whereby free radial movement is allowed between the spindle and the driving member thereby obviating the transmission of vibrations between these two members. The construction also contemplates a construction wherein the rotation of the work may be stopped at any time for calibration or inspection without stopping the counter-shaft and to this end a friction clutch, preferably of the disk type, is provided between the driving member and the face plate. The pawl and slot connection previously referred to is provided between the face plate and the spindle so that where it is desired the spindle may be stopped and a clamp nut tightened on the end thereof thereby providing a dead center and the face plate may be driven through the disk clutch to rotate work supported on the dead center. This device is also adaptable for other practices in common use in connection with headstock grinding devices.

Figure 1:
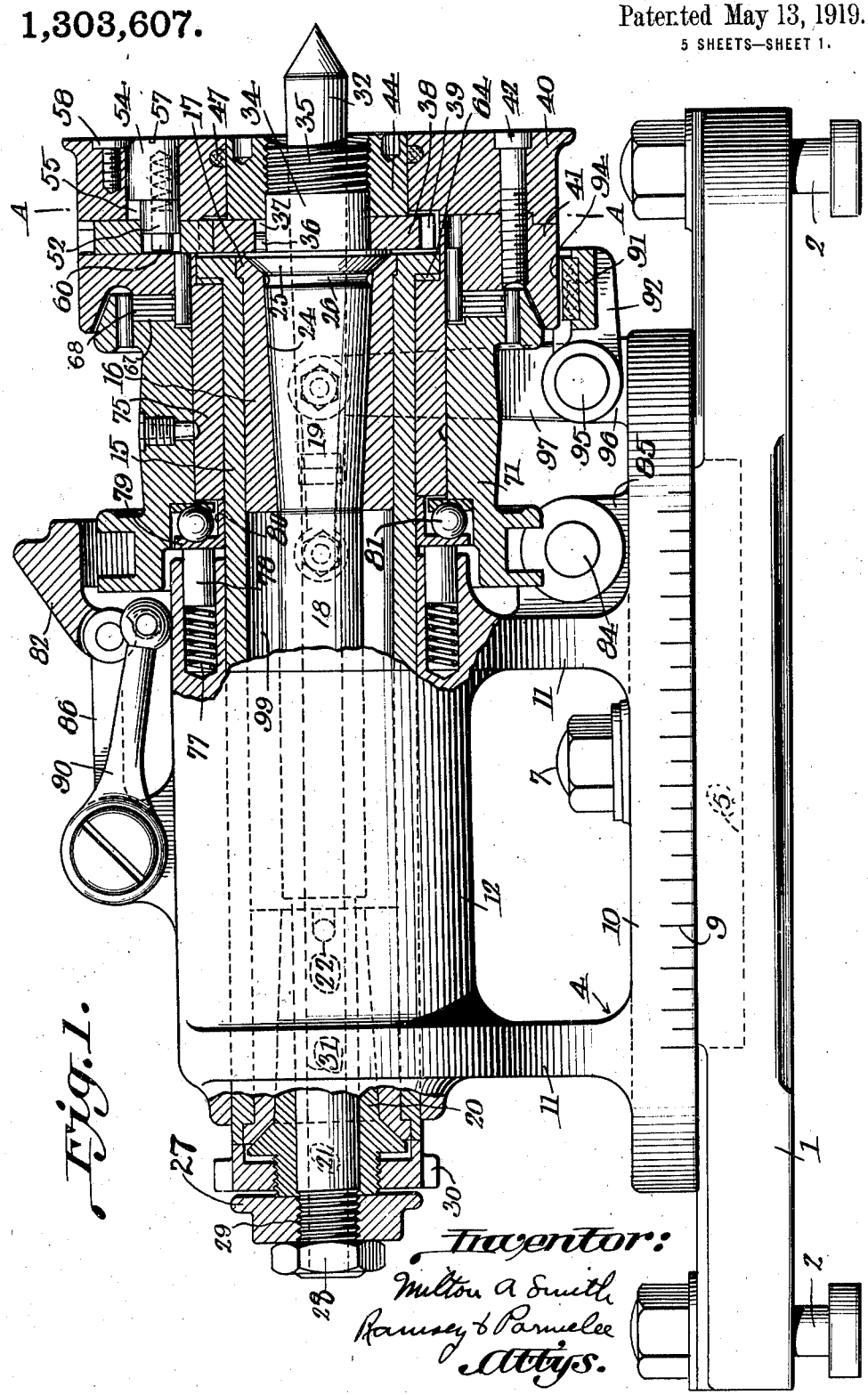
Figure 1 is a view illustrating the headstock in elevation and showing portions thereof in section.
Figure 2:
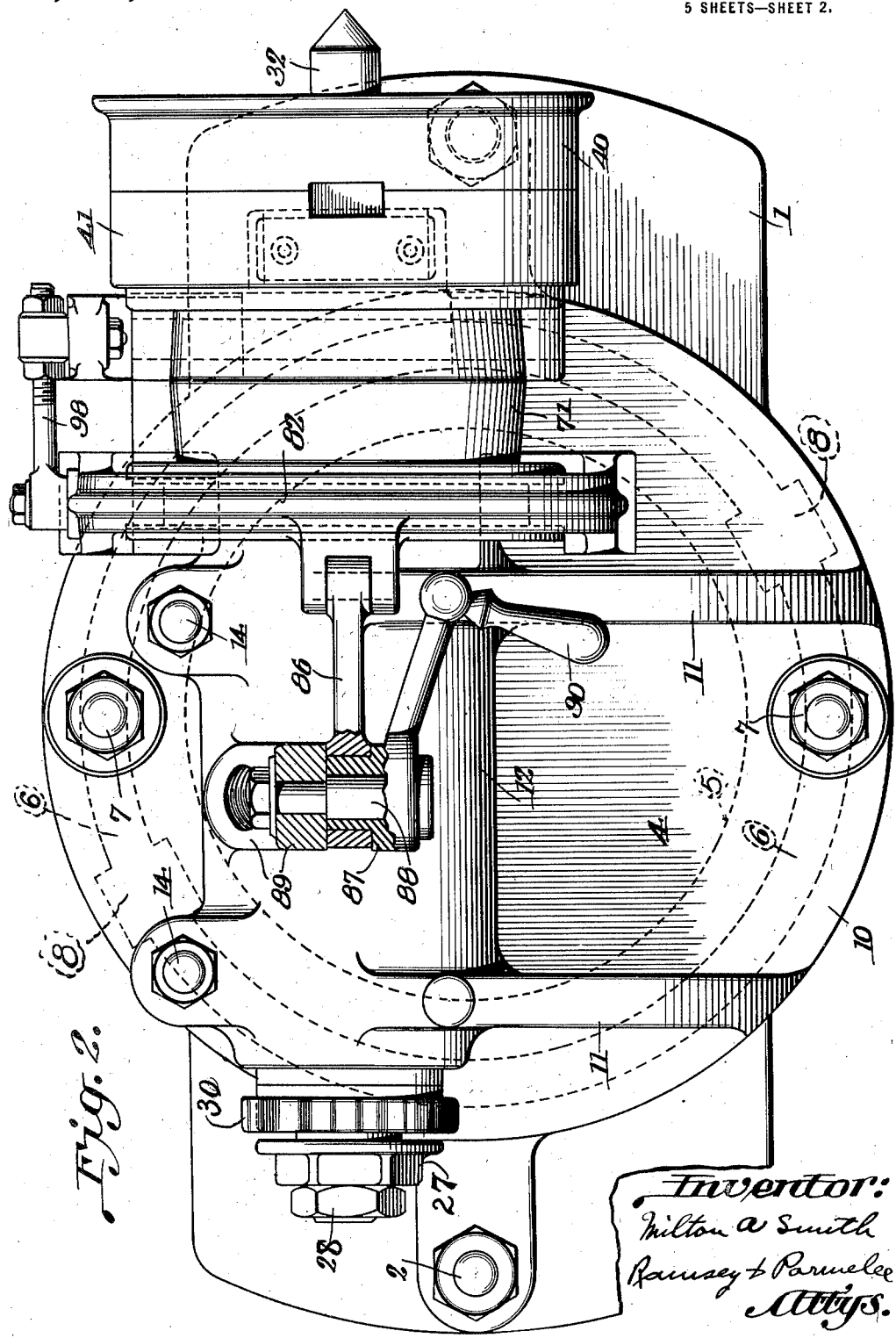
Fig. 2 is a plan view.
Figure 3:
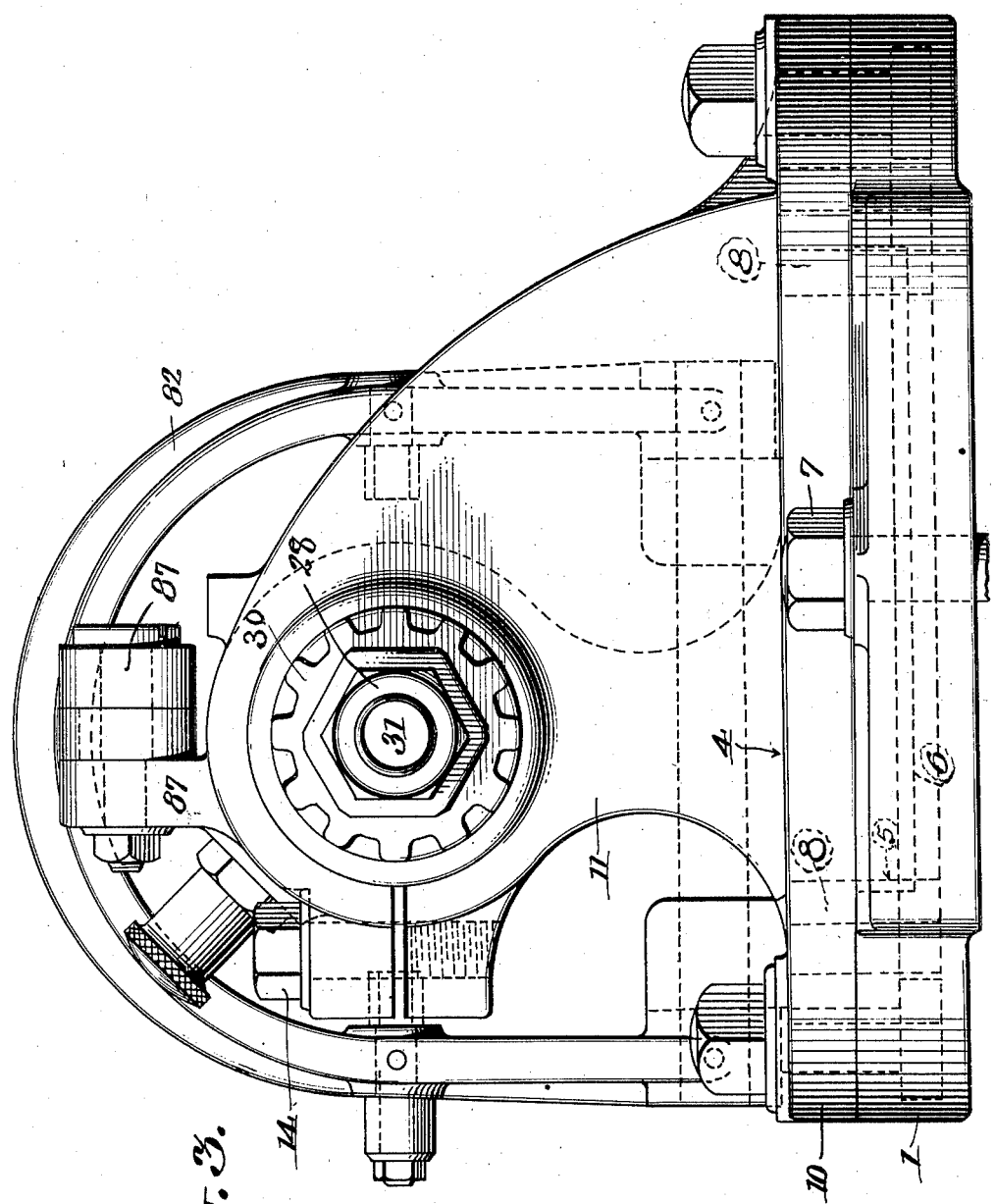
Fig. 3 is an end elevation.
Figure 4:
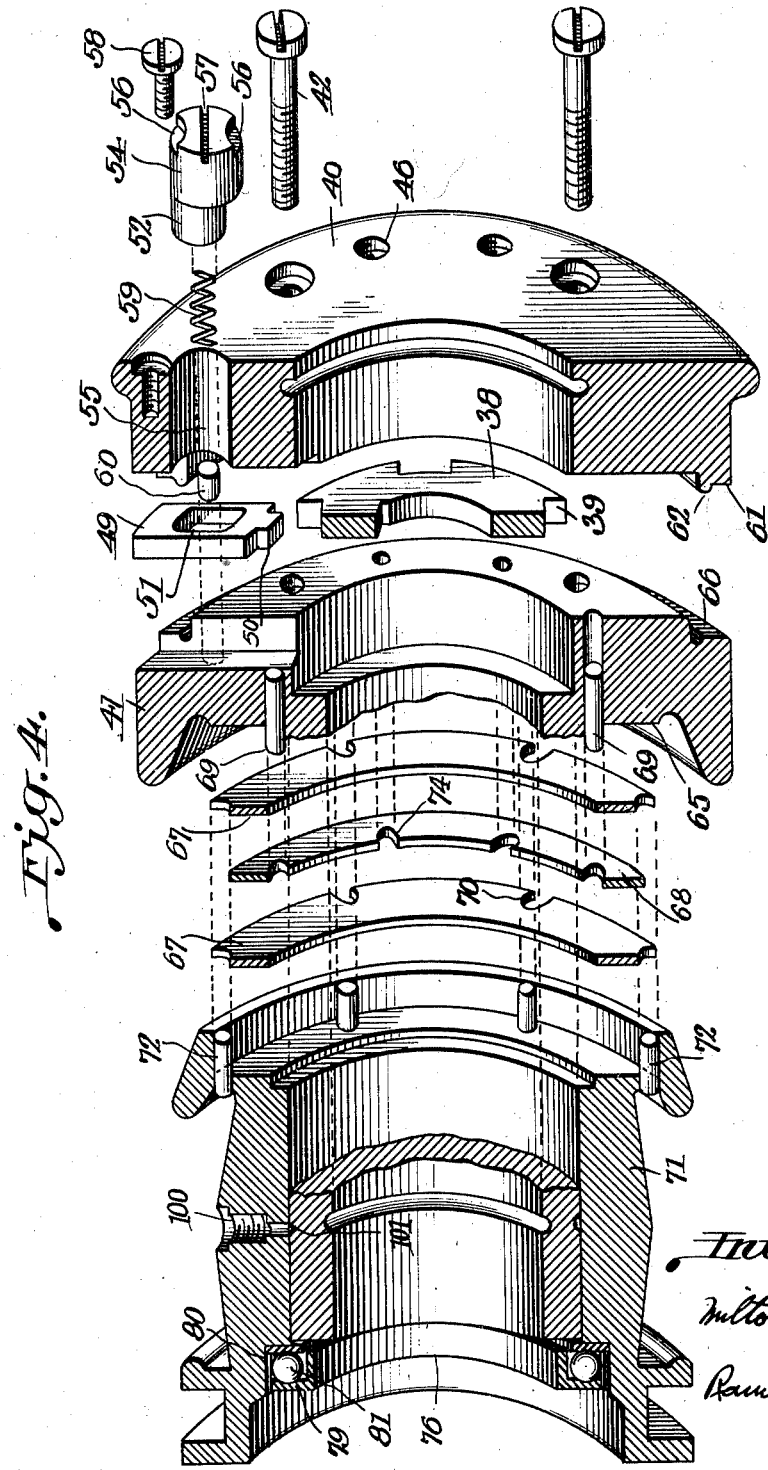
Fig. 4 is a detail view showing the parts of the driving pulley, the disk clutch, the positive clutch, and the face plate, in extended relation.
Figures 5, 6:
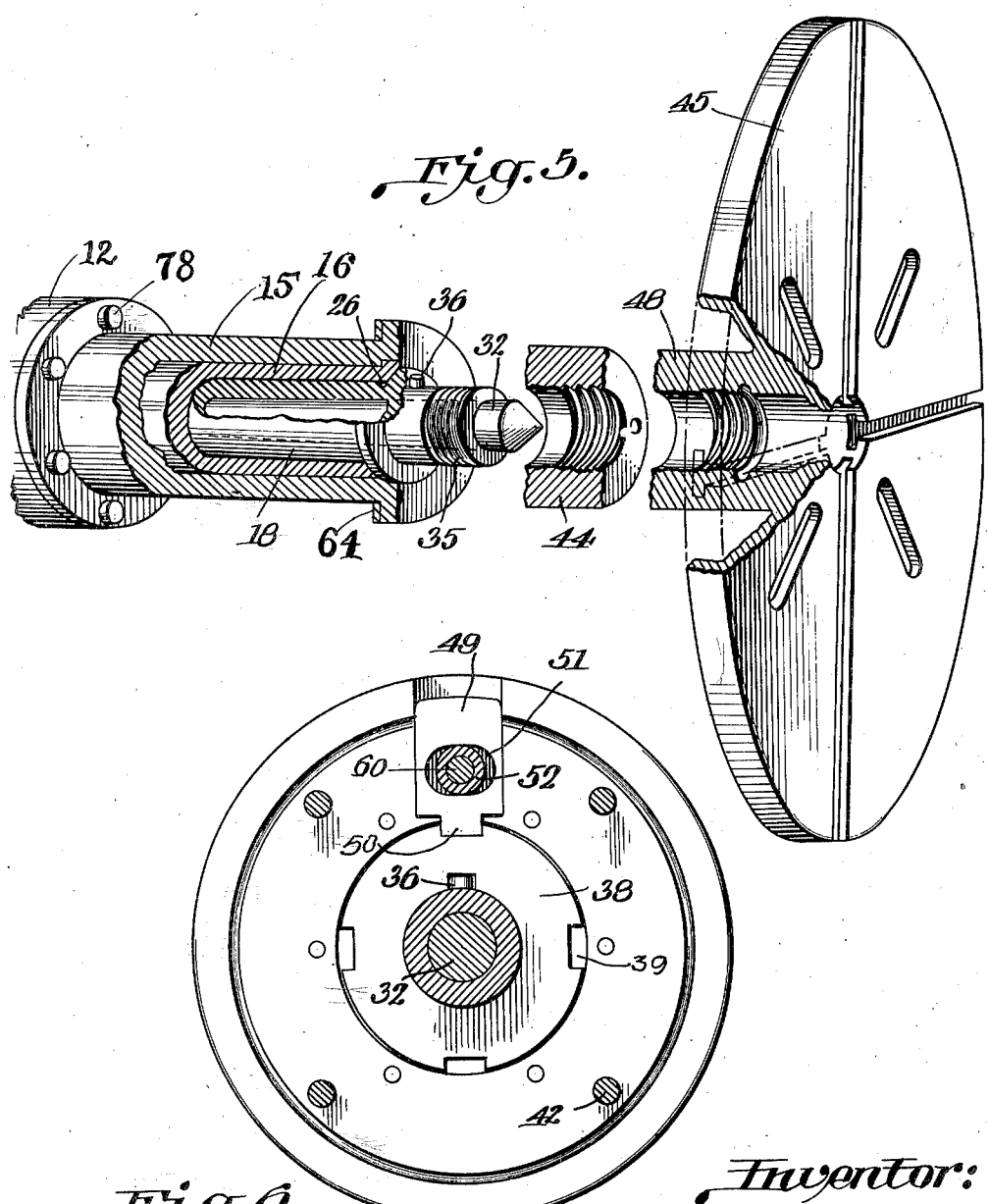
Fig. 5 is a detail view showing the quill, the driven shaft, the bearings therefor, and illustrating the spindle drive ring nut as being removable and replaceable by suitable face plates.
Fig. 6 is a view taken on section line A—A of Fig. 1.

Referring now to the drawings and more particularly to Figs. 1, 2 and 3, the headstock base 1 is provided with suitable fastening devices, such as T-head bolts 2, whereby the headstock base may be secured in position upon a suitable bed carried by the main machine frame (not shown). The headstock base 1 carries the headstock frame 4 which is provided with a short cylindrical depending portion 5 that is seated in an accurately formed opening in the headstock base and upon which portion the headstock frame 4 may be turned for grinding tapers and other purposes as will be hereinafter specified. To facilitate the rigid securing of the headstock frame 4 upon the headstock base 1 a circular undercut groove 6 is provided in the headstock base 1 and suitable T-headed bolts 7 are adapted to be inserted through the openings 8 with the heads thereof movable in the groove 6 and adapted to clamp the headstock frame rigidly in definite angular positions that may be indicated by the scale 9 on the base 10 of the head stock frame. Upwardly extending webs 11 carry integral therewith a split clamping cylinder 12, the clamping operation being controlled by the clamp screws 14. A steel tube or quill 15 is adapted to be tightly clamped within the split cylinder 12 and is constructed to carry spindle bushings 16 in both ends thereof. Preferably the quill 15 is recessed to provide shoulders adapted to receive the collars 17 on the ends of the spindle bushings whereby pressure may be applied endwise of the bushings without displacing the bushings from their position within the quill. Preferably the bearing faces of the bushings are conical and receive accurately ground taper bearings for the spindle 18. The forward bearing 19 may be formed directly on the spindle 18 and the rear bearing 20 preferably is a separate member slidably mounted upon a recessed portion 21 of the spindle 18. In order that the rear bearing 20 may rotate with the spindle it is preferable that a pin and slot connection, as at 22, be formed between the rear bearing 20 and the spindle 18. The general form of both rear and forward bearings is substantially the same and comprises relatively long conical portions 24 of a slight taper and relatively short conical portions 25 of an abrupt taper with oil grooves 26 between the conical portions. The recessed portion 21 of the spindle is provided on its rear end with screw threads upon which is mounted a spindle lock nut 27 for locking the rear spindle bearing 20 upon the spindle 18, and the spindle lock nut is retained seated by the check nut 28. The rear bearing 20 is also threaded, as at 29, and carries the dead center lock nut 30 whereby by tightening this nut the spindle is clamped against rotation for dead center work. The spindle is provided with a central opening 31 which leads to the conical recess formed in the forward end of the spindle to provide a seat for the conical center pin 32 as is common in the art. The forward end of the spindle 18 is provided with a cylindrical portion 34 part of which is threaded, as at 35. A spindle drive ring key 36 is seated in the cylindrical part 34 and is adapted to extend into a slot 37 in the spindle drive ring 38. This spindle drive ring is provided with a plurality of locking slots 39 and is retained in position on the spindle by the face plate 40 which is secured to the clutch ring 41 by means of machine screws 42. The central portion of the face plate preferably is recessed to permit the spindle drive ring nut 44 to be positioned on the threaded portion 35 of the spindle. The spindle drive ring nut may be removed and suitable large face plates or chuck plates 45 (see Fig. 5) may be screwed in position upon the spindle. The headstock face plate 40 is preferably drilled at suitable intervals to provide threaded openings 46 adapted to receive stub bolts or other fixtures to secure work against the face plate as may be desired. Preferably a felt ring 47 is carried by the headstock face plate 40 and forms a dust proof joint between the spindle drive ring nut 44 or the neck 48 of a suitable movable face plate. A locking pawl 49 is mounted for radial movement in suitable slots provided in the rear of the headstock face plate 40, and the front of the clutch ring 41. This locking pawl is provided with a locking stud 50 adapted to accurately fit the locking slots 39 in the spindle drive ring 38 (Fig. 4). This locking pawl is also provided with a transverse oval opening 51 (Figs. 4 and 6) in which extends the eccentric plug 52 of the rotatable plug 54. The rotatable plug 54 is mounted within a suitable cylindrical opening 55 in the face plate 40 and is adapted to have rotative and longitudinal movement therein. The rotatable plug 54 is provided with recesses 56 on each side of the kerf 57 to permit the heads of the screw 58 to lock the plug 54 against rotation when the spring 59 acting on the plug 60 moves the rotatable plug 54 outwardly as pressure is released after the said rotatable plug has been turned by a screw driver or other tool. It is obvious that rotation of the plug 54 inserts or withdraws the locking stud 50 from the locking slots 39 at the will of the operator. The clutch ring 41 is preferably cut-away at its periphery to provide for the reception of the ring 61 and bead 62 on the headstock face plate 40 in order to provide a secure interlocking relation between these parts. The forward end of the quill 15 is provided with a thrust ring 64 and the clutch ring 41 is recessed, as at 65, (Fig. 4) to seat against this thrust ring. The clutch ring is also undercut or recessed, as at 66, (Fig. 4) to provide for the clutch disks 67 and 68. The clutch ring 41 is provided with a plurality of pins 69 that pass through openings 70 in the clutch disks 67 whereby these disks are rotatable with the clutch ring 41 and the driving pulley 71 is also provided with a plurality of pins 72 which coöperate with openings 74 in the clutch disks 68 whereby this set of disks is caused to rotate with the driving pulley. The clutch ring 41 is provided with an integral sleeve 75 which is mounted to run upon the forward end of the quill 15 and the driving pulley 71 is mounted to run upon the integral sleeve 75 of the clutch ring 41. A thrust bearing 76 (preferably of the ball bearing type) is provided in the undercut rear portion of the drive pulley 71 and receives the pressure exerted by the coil springs 77 mounted in recesses in the clamping cylinder 12 and acting through the thrust plugs 78 which bear against the outermost collar 79 of the thrust bearing 76. This construction normally maintains the clutch disks 67 and 68 under pressure whereby rotation of the driving pulley 71 tends to rotate the clutch ring 41 and connected parts. The rear portion of the drive pulley 71 is provided with a channel or circumferential groove 80 in which is mounted a pair of anti-friction rollers 81 that are carried on the inner side of the clutch yoke 82 which is pivoted to the headstock frame 4 by means of the shaft 84 pinned in the lower end of the yoke and extending through the lugs 85 on the headstock frame 4. The yoke 82 is operatively connected by means of the link 86 with a hand operated eccentric 87 that is rotatably mounted on the eccentric stud 88 secured in the lug 89 on the top of the clamping cylinder 12 so that by operating the handle 90 to turn the eccentric 87 the yoke 82 through connected parts moves the drive pulley 71 lengthwise on the sleeve to relieve the clutch disks 67 and 68 from the pressure exerted by the coiled springs 77 thereby releasing the friction clutch and permitting the drive pulley to run idle. To save time and permit quick stoppage of the face plate, a friction brake shoe 91 carried by the brake arm 92 is adapted to be brought into engagement with the smooth cylindrical surface 94 on the ring 41. The brake arm 92 is fixedly mounted upon a shaft 95 and is mounted to rotate in lugs 96 extending from the base 10 of the headstock frame 4, and the shaft 95 carries an upstanding arm 97 which is connected by means of the adjustable link 98 with the clutch yoke 82. By this construction it will be noted that when the friction clutch is opened the brake is automatically applied. Preferably the space 99 within the quill 15 and surrounding the spindle 18 is filled with suitable lubricant which gradually feeds through openings 100 into the oil groove 101 provided in the sleeve 75.

From the foregoing description it will be noted that the spindle 18 is supported in widely separated bearings and that the forward bearing is very near the face plate and the end of the center pin so that a very rigid steady rotation of these parts is provided. It is also to be noted that the spindle 18 "floats" relatively to the driving pulley 71 and that the rotation of the work may be stopped at any time without stopping the driving pulley. Furthermore, that the spindle and the center carried thereby may be changed from a "live" center to a "dead" center by releasing the positive clutch and tightening the spindle locking nut.

Also from the foregoing description it is to be noted that when the face plate 40 is permanently positioned upon the clutch ring 41 that the sleeve 75 integral with the clutch ring 41 and the face plate are substantially one mechanical unit, and the face plate may therefore be said to rotate upon the quill 15.

Realizing that it is possible to vary the structural or physical embodiment of my invention without departing from the scope thereof I desire that the specific structure disclosed be understood as illustrative and not in the limiting sense.

Having thus described my invention what I claim is:—

1. A headstock for grinding machines and the like comprising in combination, a spindle, means to support said spindle, and a floating drive operatively connected with said spindle and mounted to rotate upon the support for said spindle and independently of the bearings for said spindle.

2. In a headstock for grinding machines and the like the combination of, a spindle, a stationary quill in which said spindle is mounted, a bearing formed on said stationary quill, driving means adapted to rotate on said bearing, and a connection between said driving means and said spindle whereby said spindle may be driven in such manner that vibrations in said driving means are not transmitted to said spindle.

3. A headstock for grinding machines and the like, comprising a spindle, a face plate mounted independently of said spindle, and a floating drive between said face plate and said spindle whereby vibrations of the face plate are not transmitted directly to the spindle.

4. A headstock for grinding machines and the like, comprising a spindle, a face plate having a bearing concentric with and independent of said spindle, and a positive clutch between said face plate and said spindle.

5. A headstock for grinding machines and the like, comprising a spindle, a face plate mounted upon a bearing independent of said spindle, and a positive clutch between said face plate and said spindle, said positive clutch permitting relative radial movement between said face plate and said spindle.

6. A headstock for grinders and the like, comprising a rotatably mounted spindle, a face plate mounted to rotate on a bearing support independent of said spindle and with the axis of rotation of said face plate co-incident with the axis of said spindle, and operative driving connections between said face plate and said spindle whereby said face plate and said spindle may have relative radial movement.

7. A headstock for grinding machines and the like comprising in combination a spindle, a face plate member having the bearing thereof concentric with said spindle and supported independently of said spindle, stationary means upon which said member is mounted to rotate and which comprises the support for said member, and a drive pulley mounted to rotate upon a portion of the said face plate member.

8. In a headstock for grinding machines and the like, a spindle, a floating drive supported independently of said spindle but operatively connected therewith, said floating drive comprising a driving pulley, and a friction clutch for transmitting power from said driving pulley.

9. In a headstock for grinding machines and the like, a spindle, and driving means mounted concentric with and supported independently of said spindle, said driving means comprising a driving pulley and a friction clutch.

10. In a headstock for grinding machines and the like, a spindle, a face plate having a bearing independent of said spindle and concentric therewith, a pulley mounted to rotate upon said face plate, a friction clutch operatively connecting said pulley with said face plate, and driving means connecting said face plate with said spindle.

11. In a headstock for grinding machines and the like, a spindle, a floating drive independently supported relative to said spindle, and a positive clutch between said floating drive and said spindle, said clutch being constructed to allow at all times independent radial movements between said drive and said spindle.

12. In a headstock for grinding machines and the like, a spindle, and a floating drive for said spindle, said floating drive comprising a driving pulley supported independently of said spindle, a friction clutch and a positive clutch.

13. In a headstock for grinding machines and the like, a spindle, a face plate, having the bearings thereof independent of said spindle and concentric therewith, a driving pulley rotatably mounted on said face plate, a positive clutch between said face plate and said spindle, and a friction clutch between the pulley and said face plate.

14. In a headstock for grinding machines and the like, a spindle, a floating drive for said spindle and supported independently of said spindle, said floating drive comprising a face plate operatively connected with said spindle, and a driving pulley operatively connected to said face plate by the medium of a friction clutch.

15. In a headstock for grinding machines and the like, a spindle, a floating drive for said spindle, means for rendering said drive ineffective to rotate said spindle, and means to clamp said spindle against rotation when desired.

16. In a headstock for grinding machines and the like, a rotating spindle, a face plate adapted to be operatively connected with said spindle, means for driving said face plate, a clutch intermediate said means and said face plate, and a brake operative to stop the rotation of said face plate when said clutch is opened.

17. In a headstock for grinding machines and the like, a rotatably mounted face plate, a driving pulley, a clutch between said face plate and said driving pulley, a brake adaptable to be effective on said face plate when said clutch is opened.

18. In a headstock for grinding machines and the like, a face plate, a pulley mounted upon said face plate, a clutch adapted to cause said pulley to rotate with said face plate when said clutch is effective, a friction brake, and means to open said clutch and simultaneously apply said friction brake.

19. In a headstock for grinders and the like, a hollow supporting member, a spindle within said member, a face plate mounted to rotate upon said member, and a connection between said face plate and said spindle.

20. In a headstock for grinding machines and the like, a hollow supporting member, a spindle rotatably mounted within said hollow supporting member, a face plate mounted to rotate upon the exterior of said hollow supporting member, a positive clutch between said face plate and said spindle and constructed to permit relative radial movement between said face plate and said spindle, and means to drive said face plate.

21. In a headstock for grinding machines and the like, in combination, a base plate adapted to be mounted upon a suitable machine frame, a headstock frame carried by said base plate, a quill supported by said headstock frame and extending outwardly therefrom on one side thereof, a spindle within said quill, a face plate rotatably mounted upon said quill, a driving pulley for said face plate, a positive clutch between said face plate and said spindle, and a friction clutch between said driving pulley and said face plate.

22. In a headstock for grinding machines and the like, a base plate, a headstock frame rotatably mounted upon said base plate, a clamping cylinder provided on said headstock frame, a quill mounted within said clamping cylinder, bearings for a spindle mounted within said quill, a spindle within said bearings, a driving pulley upon the exterior of said quill, and means operatively connecting said driving pulley with said spindle.

23. In a headstock for grinding machines and the like, a base plate, said base plate adapted to be secured to a suitable machine frame, a headstock frame mounted upon said base plate to rotate on a vertical axis, a quill carried by said headstock frame, a pair of conically bored bushings fixedly mounted within said quill, a spindle provided with a conical bearing on one end thereof, a conical bearing sleeve on the other end of said spindle and slidable therewith, a pin and slot connection between said sleeve and said spindle, means to adjust said sleeve and said spindle to properly seat said bearing within said bushings, and driving mechanism for said spindle carried by said quill and independent of said spindle.

24. In a headstock for grinding machines and the like, a base plate, a headstock frame mounted upon said base plate and rotated on a vertical axis, a clamp cylinder comprising a portion of said headstock frame, a quill within said clamp cylinder, means for clamping said quill within said clamp cylinder, a spindle within said quill, a face plate, means for driving said face plate, a center pin carried by said spindle, and means to render said spindle stationary to enable said center pin to operate as a dead center.

25. In a headstock for grinding machines and the like, a base plate, a headstock frame mounted upon said base plate, a supporting member extending from one side of said headstock frame, a face plate carried by said supporting member, a driving pulley, a disk clutch between said driving pulley and said face plate, said pulley being provided on one end with a channel comprising a groove, a yoke extending over said groove, projecting members extending from said yoke into said groove, hand operated means for swinging said yoke to move said pulley lengthwise of its axis to release said friction clutch.

26. In a headstock for grinding machines and the like, a base plate, a headstock frame supported by said base plate, a bearing support extending from one side of said headstock frame, a face plate mounted to rotate upon said bearing support, said face plate being provided with a sleeve, a pulley mounted upon said sleeve and adapted to rotate relatively thereto, a friction clutch between said pulley and said face plate, pressure producing means carried by the headstock frame and operative on said pulley to render said clutch effective, and means for relieving said clutch of said pressure to permit said pulley to rotate independently of said face plate.

27. In a headstock for grinding machines and the like, a base plate, a headstock frame mounted upon said base plate, a bearing member extending from one side of said headstock frame, a face plate mounted upon said bearing member, said face plate comprising a sleeve, a thrust ring carried by said bearing member, a driving pulley rotatably mounted upon the sleeve of said face plate, a friction clutch between said sleeve and said driving pulley, means for opening said clutch, and a brake effective to retard the rotation of said face plate when said clutch is opened.

28. In a headstock for grinding machines and the like, a frame, a spindle supported by said frame, a face plate supported independently of said spindle, said face plate comprising a sleeve, a pulley adapted to run upon said sleeve, a clutch intermediate said pulley and said face plate, means for operating said clutch, and a brake adapted to automatically retard the rotation of said face plate when said clutch is opened.

29. In a headstock for grinding machines and the like, a headstock frame, a face plate supported by said headstock frame and adapted to rotate upon substantially a horizontal axis, a driving pulley for said face plate, a friction clutch between said face plate and said driving pulley, said pulley being provided with an annular groove, a yoke extending over said annular groove and being provided with projections extending into said annular groove, a friction brake, means connecting said friction brake with said yoke, and a lever to operate said yoke to open said clutch to render said brake effective.

30. A headstock for grinding machines and the like, comprising a headstock frame, a spindle supporting quill carried by said headstock frame, a spindle within said quill, and means concentric with said spindle and supported by said quill for driving said spindle.

31. In a headstock for grinding machines and the like, a headstock frame, a rigid supporting tube carried by said headstock frame and extending outwardly from one side thereof, a rotating spindle adjustably mounted within said tube, a face plate comprising a sleeve mounted to rotate on the exterior of said tube, a driving pulley normally rotating upon said sleeve, and a friction clutch for causing said driving pulley and said sleeve to rotate as a unit.

32. In a headstock for grinding machines and the like, in combination, a spindle, a bushing having a conical bore therein, a cone-shaped bearing on said spindle and adapted to fit within said bushing, and a locking nut constructed to draw said spindle endwise to clamp said bearing tightly within said bushing to hold said spindle stationary for dead center grinding.

33. In a headstock for grinding machines and the like, a suitable frame, a bushing supported by said frame, said bushing being provided with a relatively long tapering opening and terminating in a short tapering opening, the sides of which are at a greater angle than the long opening, a spindle adapted to carry a center pin, a bearing on said spindle adjacent the end thereof for carrying the center pin, said bearing comprising a relatively long tapered portion and a relatively short tapered portion of greater inclination than the first mentioned portion, a clamp nut operatively connected with said spindle and adapted to draw said bearing into said bushing to hold the said spindle rigid and stationary while the headstock is to be used for dead center grinding.

MILTON A. SMITH.